(12) United States Patent
Gupta et al.

(10) Patent No.: US 12,353,639 B2
(45) Date of Patent: Jul. 8, 2025

(54) METHODS, SYSTEMS, APPARATUSES, AND DEVICES FOR FACILITATING IMPROVING BEHAVIORAL SKILLS OF USERS

(71) Applicant: EdMyst Inc., Lewes, DE (US)

(72) Inventors: Vivek Gupta, Wallingford, CT (US); Bhuwan Mahajan, Gurugram (IN); Anamika Sharma, Gurugram (IN); Tawheed Makhdoomi, Vancouver, WA (US)

(73) Assignee: EdMyst Inc., Lewes, DE (US)

( * ) Notice: Subject to any disclaimer, the term of this patent is extended or adjusted under 35 U.S.C. 154(b) by 0 days.

(21) Appl. No.: 18/642,159

(22) Filed: Apr. 22, 2024

(65) Prior Publication Data

US 2024/0353932 A1 Oct. 24, 2024

Related U.S. Application Data

(60) Provisional application No. 63/460,603, filed on Apr. 20, 2023.

(51) Int. Cl.
G06F 3/01 (2006.01)
(52) U.S. Cl.
CPC .................... *G06F 3/017* (2013.01)
(58) Field of Classification Search
None
See application file for complete search history.

(56) References Cited

U.S. PATENT DOCUMENTS

| | | | | |
|---|---|---|---|---|
| 2018/0039629 | A1* | 2/2018 | Arsikere | G06N 20/00 |
| 2020/0057821 | A1* | 2/2020 | Tagra | G06V 20/49 |
| 2022/0020288 | A1* | 1/2022 | Naber | G10L 15/187 |
| 2023/0104655 | A1* | 4/2023 | Amarasingham | G16H 15/00 705/2 |
| 2023/0260536 | A1* | 8/2023 | Xu | G10L 25/63 704/231 |
| 2023/0329630 | A1* | 10/2023 | Patel | A61B 5/08 |
| 2024/0021196 | A1* | 1/2024 | Bolzoni | G06F 16/285 |
| 2024/0153398 | A1* | 5/2024 | Ji | G06F 40/30 |

* cited by examiner

*Primary Examiner* — Rinna Yi
(74) *Attorney, Agent, or Firm* — Dhiraj Jindal; PATENT YOGI LLC

(57) ABSTRACT

Disclosed herein is a method of facilitating improving behavioral skills of users, in accordance with some embodiments. Accordingly, the method comprises receiving, using a communication device, a request from a user device. Further, the method comprises obtaining, using a processing device, a content based on the request. Further, the method comprises analyzing, using the processing device, the content using machine learning models. Further, the machine learning models are configured for determining the communication attributes. Further, the method comprises identifying, using the processing device, a behavioral skill from behavioral skills based on the determining. Further, the method comprises generating, using the processing device, a score corresponding to each of the behavioral skill based on the determining of the communication attributes and the identifying. Further, the method comprises transmitting, using the communication device, the score to the device. Further, the method comprises storing, using a storage device, the score.

18 Claims, 21 Drawing Sheets

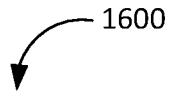

| Understanding one's emotion* | | | | |
|---|---|---|---|---|
| Understanding one's strengths* | Adaptability* | Achievement orientation* | Speaking with conviction* | |
| Self-control and regulation* | Learnability* | Ownership and accountability* | Positive Mindset* | |
| Self-motivation | Courage and risk-taking* | Grit and persistence* | Negotiation and Percussion* | Critical Thinking |
| Self-directedness | Driving change and innovation | Attention to detail* | Voice, articulation and diction* | Strategic Thinking |
| Self-confidence* | Energy, passion and optimism* | Planning | Storytelling* | Creative Problem solving |
| Resilience* | Dealing with uncertainty* | Project management | Presentation Skills* | Dig Picture Thinking |
| Purpose-driven | Unconventional approach (breaking stereotypes and barriers) | Time management and prioritization | Synthesizing messages* | Exploring perspectives and alternatives |
| Self Awareness & Self Management | Agility & Entrepreneurial Mindset | Result Focused | Communication | Cognitive Flexibility |
| Personal Skills to Thrive as a Loader | | | | |

| | | Motivating and inspiring others | Understanding of external environment |
|---|---|---|---|
| | | Empowering others | Contextualization of knowledge* |
| | Instilling trust* | Developing others | Organizational awareness* |
| Fostering inclusiveness | Collaboration skills* | Role modeling | Commercial acumen* |
| Promoting culture of respect | Openness to feedback* | Coaching | Vision alignment* |
| Inclusivity | Developing relationships | Team effectiveness and development | Business environment awareness |
| Interpersonal Skills to Inspire as a Loader | | | |

FIG. 17

METHODS, SYSTEMS, APPARATUSES, AND DEVICES FOR FACILITATING IMPROVING BEHAVIORAL SKILLS OF USERS

REFERENCE TO RELATED APPLICATIONS

This application claims the benefit of U.S. Provisional Patent Application No. 63/460,603, titled "METHODS AND SYSTEMS OF FACILITATING IMPROVEMENTS IN BEHAVIORAL SKILLS USING COMMUNICATION ATTRIBUTES, NONVERBAL CUES AND SENTIMENTS", filed 20 Apr. 2023, which is incorporated by reference herein in its entirety.

FIELD OF THE INVENTION

Generally, the present disclosure relates to the field of data processing. More specifically, the present disclosure relates to methods, systems, apparatuses, and devices for facilitating improving behavioral skills of users.

BACKGROUND OF THE INVENTION

The field of data processing is important to several industries, business organizations, and/or individuals.

Millions of people, especially graduating students and working professionals, lose out on many career opportunities to find suitable employment. Even though these students and working professionals receive a lot of feedback on their areas of development, like "you do not appear confident, and you were not speaking concisely or with conviction", it is not easy for the recipients to act on such non-specific feedback. Some people are hesitant to open up to others for coaching, mentoring, or training, as they fear being judged. Standard material, including videos on the internet, is not helpful, as most situations do not apply to everyone. Lack of specific, actionable insights prevents faster development of behavioral skills.

Historical approaches have mostly relied on learning content developed for masses of consumers with no personalization options. Also, personal coaches for individuals deliver 1:1 learning sessions with very limited ability to scale such engagements beyond their available number of productive hours in a day. Current technologies focus on identifying the communication attributes, like the speech rate, number of pauses one takes, volume of speech, etc., non-verbal cues, like smile and eye contact, and sentiments without highlighting the "behavioral skills" that need to be addressed for people to become a better version of themselves.

Existing technologies do not use artificial intelligence (AI) to help every person diagnose their specific behavioral skill gaps, practice, and get better at them.

Therefore, there is a need for improved methods, systems, apparatuses, and devices for facilitating improving behavioral skills of users that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a method of facilitating improving behavioral skills of users, in accordance with some embodiments. Accordingly, the method may include a step of receiving, using a communication device, at least one request from at least one user device associated with at least one user. Further, the method may include a step of obtaining, using a processing device, at least one content associated with the at least one user based on the at least one request. Further, the method may include a step of analyzing, using the processing device, the at least one content using a plurality of machine learning models. Further, the plurality of machine learning models may be configured for determining a plurality of communication attributes associated with the at least one user from the at least one content. Further, the plurality of communication attributes may include a smile gesture, an eye contact gesture, a speech pitch, a speech volume, a speech pace, a speech pause, and a sentiment. Further, the method may include a step of identifying, using the processing device, at least one behavioral skill from a plurality of behavioral skills based on the determining of the plurality of communication attributes. Further, each of the at least one behavioral skill corresponds to at least one communication attribute of the plurality of communication attributes. Further, the method may include a step of generating, using the processing device, a score corresponding to each of the at least one behavioral skill based on the determining of the plurality of communication attributes and the identifying. Further, the method may include a step of transmitting, using the communication device, the score to the at least one user device. Further, the method may include a step of storing, using a storage device, the score.

Further disclosed herein is a system for facilitating improving behavioral skills of users, in accordance with some embodiments. Accordingly, the system may include a communication device, a processing device, and a storage device. Further, the communication device may be configured for receiving at least one request from at least one user device associated with at least one user. Further, the communication device may be configured for transmitting a score to the at least one user device. Further, the processing device may be communicatively coupled with the communication device. Further, the processing device may be configured for obtaining at least one content associated with the at least one user based on the at least one request. Further, the processing device may be configured for analyzing the at least one content using a plurality of machine learning models. Further, the plurality of machine learning models may be configured for determining a plurality of communication attributes associated with the at least one user from the at least one content. Further, the plurality of communication attributes may include a smile gesture, an eye contact gesture, a speech pitch, a speech volume, a speech pace, a speech pause, and a sentiment. Further, the processing device may be configured for identifying at least one behavioral skill from a plurality of behavioral skills based on the determining of the plurality of communication attributes. Further, each of the at least one behavioral skill corresponds to at least one communication attribute of the plurality of communication attributes. Further, the processing device may be configured for generating the score corresponding to each of the at least one behavioral skill based on the determining of the plurality of communication attributes and the identifying. Further, the storage device may be communicatively coupled with the processing device. Further, the storage device may be configured for storing the score.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

FIG. 16 illustrates a first portion of an EdMyst periodic table 1600 associated with a software application (EdMyst) for facilitating improving behavioral skills of users, in accordance with some embodiments.

FIG. 17 illustrates a second portion of the EdMyst periodic table 1600, in accordance with some embodiments.

DETAILED DESCRIPTION OF THE INVENTION

Figure 1:
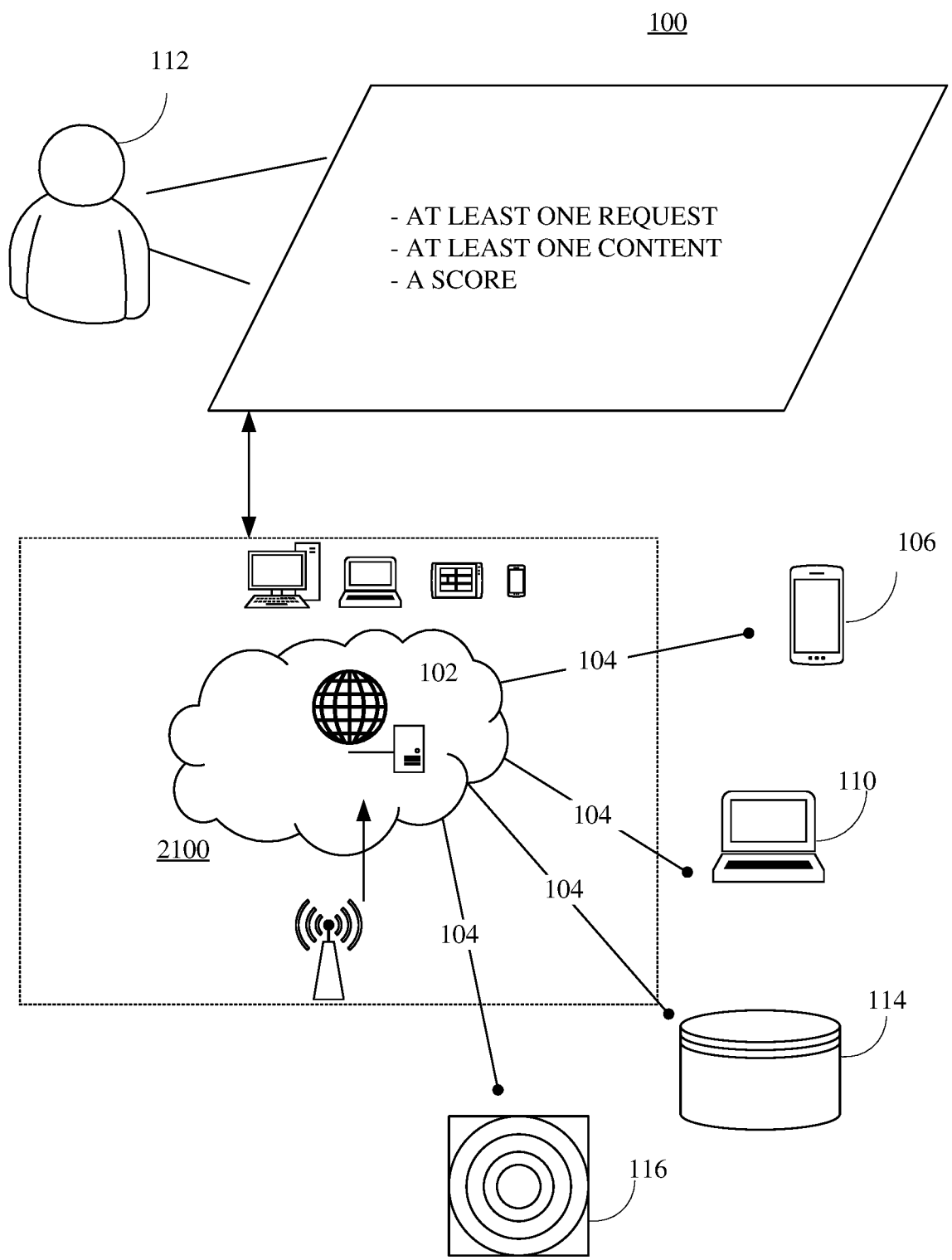
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise.

Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of methods, systems, apparatuses, and devices for facilitating improving behavioral skills of users, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor, and at least one actuator. Examples of the one or more client devices and/or the server computer may include, a desktop computer, a laptop computer, a tablet computer, a personal digital assistant, a portable electronic device, a wearable computer, a smartphone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server, etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface, etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, a public database, a private database, and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled, and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal, or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer, etc.) and/or possession of a machine readable secret data (e.g. encryption key, decryption key, bar codes, etc.) and/or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera, and so on. Likewise, the one or more steps may include receiving, using the communication device, the one or more embodied characteristics from one or more biometric sensors.

Further, one or more steps of the method may be automatically initiated, maintained, and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device, etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor, etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions.

For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data, and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview

The present disclosure describes methods, systems, apparatuses, and devices for facilitating improving behavioral skills of users.

The present disclosure describes methods and systems of facilitating improvements in behavioral skills using communication attributes, non-verbal cues, and sentiments. Further, the disclosed system may be associated with a software platform (such as a software application or website). Further, Edy, an exemplary embodiment of the disclosed software platform, pinpoints specific areas to be improved and areas a user is excelling. For example, a user may submit a selfie video of a mock elevator pitch, and Edy may tell the user exactly why the user did not appear confident or did not sound convincing. All of this may be done in the privacy of one's space and convenience of schedule. Further, the disclosed software may be designed to be deployed at scale and provide data-driven specific insights and personalized learning experiences. Further, Edy analyzes users' video recordings to provide data-driven insights and recommendations for improvements in their behavioral skills for different situations.

Further, Edy, an exemplary embodiment of the disclosed system herein, may be configured to detect behavioral skills in human beings.

Further, the disclosed system may be configured to detect communication attributes, non-verbal cues, and sentiments that are then translated to display behavioral skills in human beings. This translation of communication attributes, non-verbal cues, and sentiments to the behavioral skills is a unique development.

Further, the detected communication attributes, non-verbal cues, and sentiments in the selfie videos, recorded live or a pre-recorded video may be (1) speech rate, (2) pauses, (3) volume, (4) filler words, (5) words that are being repeated, (6) non-verbal cues (facial expression attributes), and (8) sentiments. Further, the non-verbal cues (facial expression attributes) may include eye contact and a smile; and sentiments may imply positive or negative sentiments expressed by the user.

Further, the behavioral skills that may be detected using the communication attributes, non-verbal cues, and sentiments are:
1) For Self-awareness & Self-Management: a) Understanding one's emotions, b) Understanding one's strengths, c) Self-control and regulation, d) Self-confidence, and e) Resilience.
2) For Agility & Entrepreneurial Mindset: a) Adaptability, b) Learnability, c) Courage and risk-taking, d) Energy, passion, and optimism, and e) Dealing with uncertainty
3) For Results-focus: a) Achievement orientation, b) Ownership and accountability, c) Grit and persistence, and d) Attention to detail.
4) For communication: a) Speaking with conviction, b) Positive Mindset, c) Negotiation and Persuasion, d) Voice, articulation, and diction, e) Storytelling, f) Presentation Skills, and g) Synthesizing messages.
5) For developing relationships: a) Empathetic, b) Instilling trust, c) Collaboration skills, and d) Openness to feedback.
6) For business environment awareness: a) Contextualization of knowledge, b) Organizational awareness, c) Commercial acumen, and d) Vision alignment.

Further, identification of the behavioral skills using user-generated selfie videos may guarantee a scalable ability to detect and develop the behavioral skills and an unbiased, objective, and standard method of benchmarking behavioral skills across multiple users. Further, the disclosed system is configured for providing data-driven and actionable insights to users to improve their behavioral skills. Further, companies use the EdMyst software application, Edy, to standardize and develop behavioral skills pertaining to their unique and personalized requirement across different business roles. Further, universities may use the EdMyst Software Application, Edy, as a curriculum standard across different learning cohorts.

FIG. 1 is an illustration of an online platform 100 consistent with various embodiments of the present disclosure. By way of non-limiting example, the online platform 100 to facilitate improving behavioral skills of users may be hosted on a centralized server 102, such as, for example, a cloud computing service. The centralized server 102 may communicate with other network entities, such as, for example, a mobile device 106 (such as a smartphone, a laptop, a tablet computer, etc.), other electronic devices 110 (such as desktop computers, server computers, etc.), databases 114, and sensors 116 over a communication network 104, such as, but not limited to, the Internet. Further, users of the online platform 100 may include relevant parties such as, but not limited to, end-users, administrators, service providers, service consumers, and so on. Accordingly, in some instances, electronic devices operated by the one or more relevant parties may be in communication with the platform.

A user 112, such as the one or more relevant parties, may access online platform 100 through a web based software application or browser. The web based software application may be embodied as, for example, but not be limited to, a website, a web application, a desktop application, and a mobile application compatible with a computing device 2100.

Figure 2:
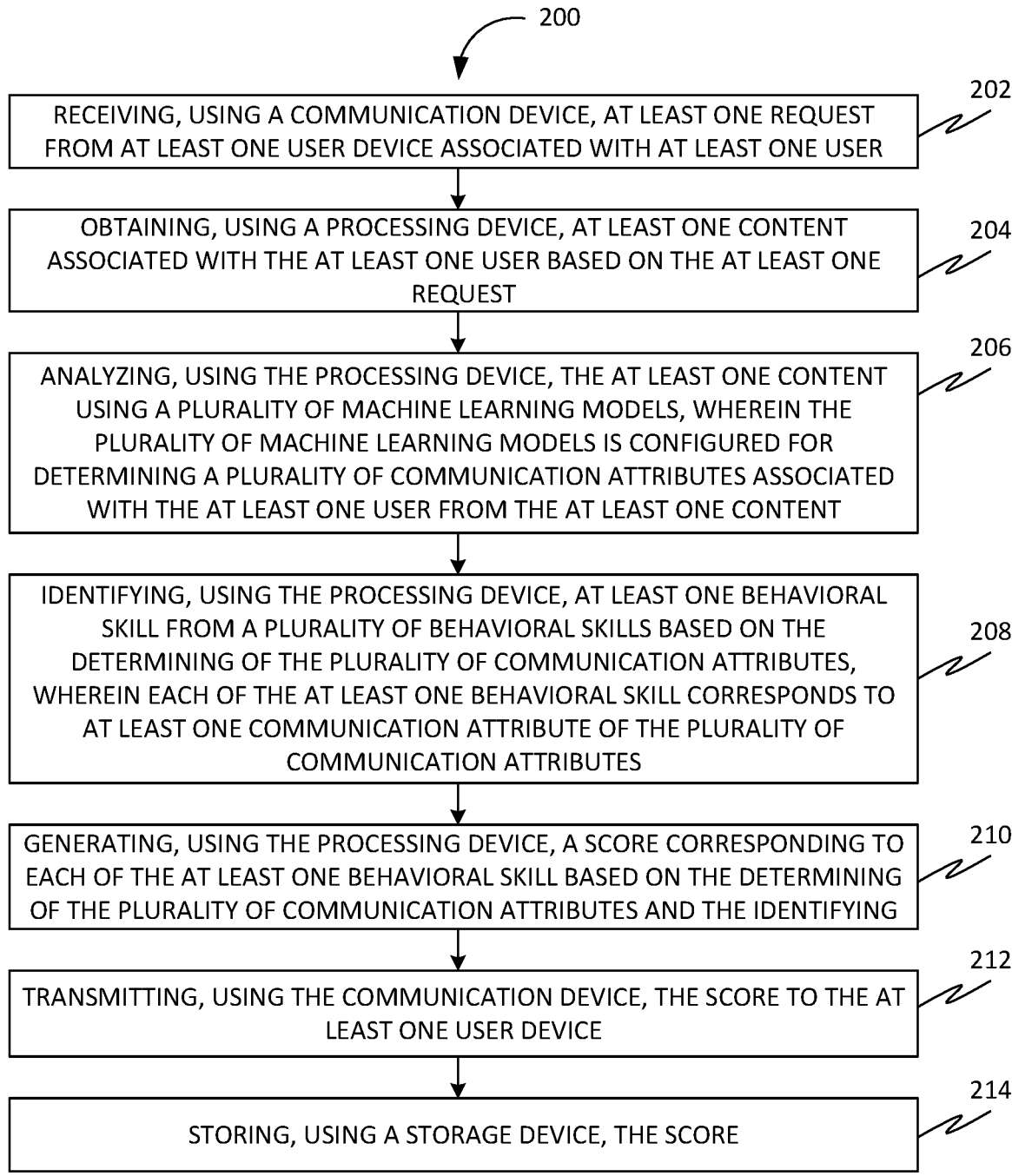
FIG. 2 is a flowchart of a method 200 for facilitating improving behavioral skills of users, in accordance with some embodiments.

FIG. 2 is a flowchart of a method 200 for facilitating improving behavioral skills of users, in accordance with some embodiments. Accordingly, at 202, the method 200 may include receiving, using a communication device, at least one request from at least one user device associated with at least one user. Further, the at least one request may include a request for assessing a behavioral skill of the at least one user. Further, the at least one request may include a user data associated with the at least one user. Further, the at least one user may include an individual, a person, etc. Further, the at least one user device may include a computing device, a client device, a sensor, an IoT device, etc.

Further, at 204, the method 200 may include obtaining, using a processing device, at least one content associated with the at least one user based on the at least one request. Further, the at least one content may include a video content, an audio video content, etc. Further, the at least one content may include a user behavior media, etc. Further, the at least one content may include a content stream, a pre recorded content, etc.

Further, at 206, the method 200 may include analyzing, using the processing device, the at least one content using a plurality of machine learning models. Further, the plurality of machine learning models may be configured for determining a plurality of communication attributes associated with the at least one user from the at least one content. Further, the plurality of communication attributes may include a smile gesture, an eye contact gesture, a speech pitch, a speech volume, a speech pace, a speech pause, and a sentiment. Further, the plurality of machine learning models may be configured for extracting one or more features from the at least one content. Further, the one or more features may include an image feature, a speech feature, etc. Further, the determining of the plurality of communication attributes may be based on the one or more features. Further, the plurality of communication attributes may include non-verbal cues. Further, the plurality of communication attributes may include a filler word, a repeated word, etc. Further, in an embodiment, Further, the plurality of machine learning models may be a plurality of trained machine learning models. Further, the plurality of trained machine learning models may be integrated with the processing device. Further, the plurality of trained machine learning models may be configured by using at least one of a machine learning technique and a deep learning technique by executing one or more algorithms. Further, the one or more algorithms may include at least one of Google Bidirectional Encoder Representations and Transformers (BERT) based transfer learning algorithm and Named Entity Based Recognition (NER) algorithms. Further, the plurality of trained machine learning models may include at least one of an image classification model created using image input features, a semantic model created by using speech and textual data, and a speech processing model created by using image input features and speech input features. Further, the image classification model may be used to determine the smile gesture based on the image input features such as a curvature of lips, an arrangement of facial muscles, a presence of teeth, etc. Further, the image classification model may be used to determine the eye contact gesture based on the image input features such as a gaze direction, a position of eyelids, etc. Further, the semantic model is used to determine the sentiment of the at least one user based on the speech input features such as a word list, a lexicon, etc. Further, the speech processing model may be used to determine the speech pitch based on the speech input features such as a frequency of a sound of the speech of the at least one user. Further, the speech processing model may be used to determine the speech volume based on the speech input features such as an energy level of the sound of the speech of the at least one user. Further, the speech processing model may be used to determine the speech pace based on the speech input features such as a timing between consecutive speech segments (such as phonemes, words, or sentences). Further, the speech processing model may be used to determine the speech pause based on the speech input features such as a silence in the speech.

Further, at 208, the method 200 may include identifying, using the processing device, at least one behavioral skill from a plurality of behavioral skills based on the determining of the plurality of communication attributes. Further, each of the at least one behavioral skill corresponds to at least one communication attribute of the plurality of communication attributes. Further, the identifying of the at least one behavioral skill may include translating at least one of the plurality of communication attributes to the at least one behavioral skill.

Further, at 210, the method 200 may include generating, using the processing device, a score corresponding to each of the at least one behavioral skill based on the determining of the plurality of communication attributes and the identifying. Further, the score defines a proficiency level of the at least one user in each of the at least one behavioral skill. Further, the score corresponds to a presence of at least one of the plurality of communication attributes. Further, in an embodiment, the plurality of machine learning models may include at least one Convolutional Neural Network (CNN) comprised in an encoder of the plurality of machine learning models for extracting the image feature. Further, the plurality of machine learning models may include at least one Recurrent Neural Network (RNN) comprised in the encoder of the plurality of machine learning models for extracting the speech feature. Further, the plurality of machine learning models may include a Long Short-Term Memory (LSTM) in a decoder of the plurality of machine learning models maps the one or more features to the plurality of communication attributes.

Further, at 212, the method 200 may include transmitting, using the communication device, the score to the at least one user device.

Further, at 214, the method 200 may include storing, using a storage device, the score.

Further, in some embodiments, the plurality of machine learning models may include a first machine learning model, a second machine learning model, a third machine learning model, and a fourth machine learning model. Further, the first machine learning model may be associated with a Google cloud video intelligence. Further, the second machine learning model may be associated with a praat parselmouth. Further, the third machine learning model may be associated with Amazon Web Service (AWS) speech-to-text. Further, the fourth machine learning model may be associated with Amazon Web Service (AWS) comprehend. Further, the first machine learning model may be configured for determining the smile gesture and the eye contact gesture from the at least one content. Further, the second machine learning model may be configured for determining the speech pitch, the speech volume, and the speech pace from the at least one content. Further, the third machine learning model may be configured for determining the speech pace from the at least one content. Further, the third machine learning model and the fourth machine learning model may be configured for determining the sentiment from the at least one content. Further, the determining of the plurality of communication attributes may be based on the determining of the smile gesture and the eye contact gesture, the determining of the speech pitch, the speech volume, and the speech pace, the determining of the speech pace, and the determining of the sentiment. Further, the Google cloud video intelligence may be based on google machine learning for video analysis. Further, the praat parselmouth may be a library based on Praat. Further, the Praat may be a software program used for analyzing, synthesizing, and manipulating speech and sound. Further, the Amazon Web Service (AWS) comprehend may be based on natural language processing (NLP) and machine learning technologies. Further, the Amazon Web Service (AWS) comprehend uses deep learning algorithms to analyze text data and extract insights such as sentiment analysis, keyphrase extraction, entity recognition, language detection, and topic modeling. Further, in an embodiment, the plurality of machine learning models may include a fifth machine learning model. Further, the fifth machine learning model may be associated with a spacy ("en_core_web_sm" model). Further, the third machine learning model and the fifth machine learning model may be configured for determining a filler word and a repeated word from the at least one content. Further, the determining of the plurality of communication attributes may be based on the determining of the filler word and the repeated word. Further, the Amazon Web Service (AWS) speech-to-text and the spacy ("en_core_web_sm" model) may be natural language processing (NLP) model that uses convolutional neural networks (CNNs) and recurrent neural networks (RNNs) to process and analyze text.

Figure 3:
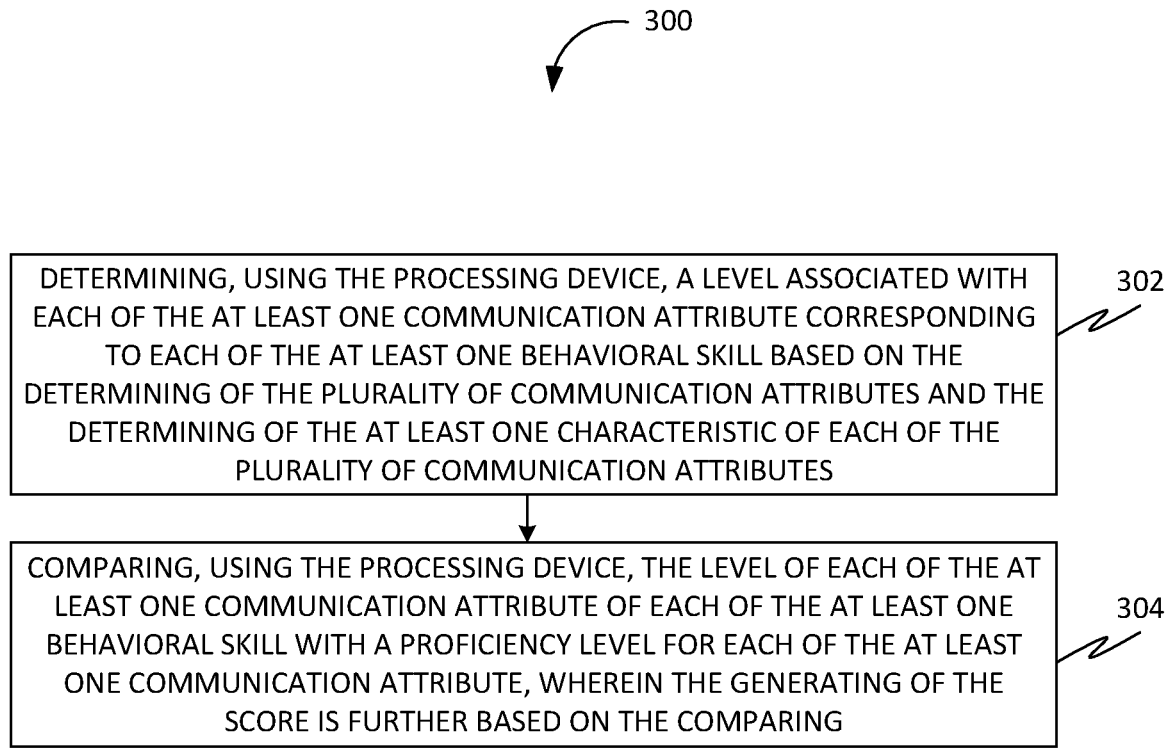
FIG. 3 is a flowchart of a method 300 for facilitating improving behavioral skills of users, in accordance with some embodiments.

FIG. 3 is a flowchart of a method 300 for facilitating improving behavioral skills of users, in accordance with some embodiments. Further, the plurality of machine learning models may be configured for determining at least one characteristic of each of the plurality of communication attributes from the at least one content. Further, the at least one characteristic may include a volume level measured in decibels (dB) associated with the speech volume, a polarity measured as a positive or a negative associated with the sentiment, a word per minute associated with the speech pace, a no of pauses associated with the speech pause, a percentage duration associated with the eye contact gesture, a percentage duration associated with the smile gesture, a number of instances associated with the repeated word, a number of instances of the filler word, etc.

Further, at 302, the method 300 may include determining, using the processing device, a level associated with each of the at least one communication attribute corresponding to each of the at least one behavioral skill based on the determining of the plurality of communication attributes and the determining of the at least one characteristic of each of the plurality of communication attributes. Further, the level ranges from a minimum level and a maximum level.

Further, at 304, the method 300 may include comparing, using the processing device, the level of each of the at least one communication attribute of each of the at least one behavioral skill with a proficiency level for each of the at least one communication attribute. Further, the generating of the score may be based on the comparing. Further, the proficiency level may be at least a percentage of the maximum level. Further, the score corresponds to the level.

Figure 4:
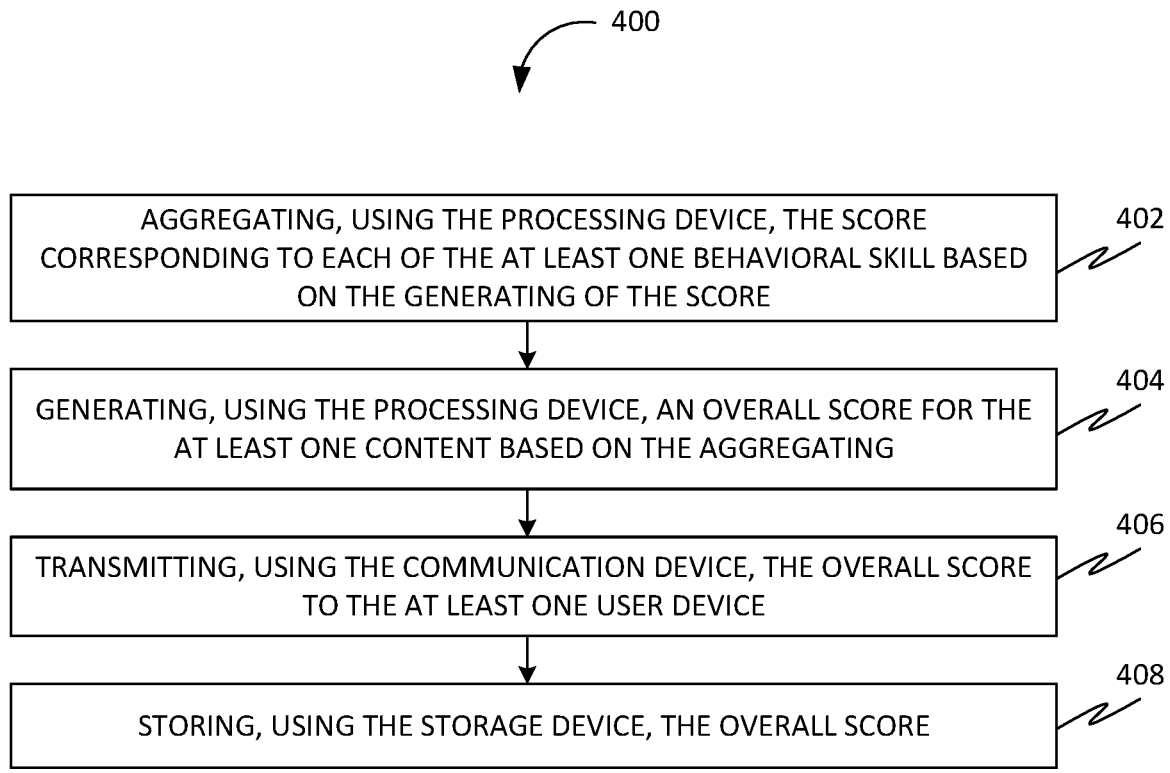
FIG. 4 is a flowchart of a method 400 for facilitating improving behavioral skills of users, in accordance with some embodiments.

FIG. 4 is a flowchart of a method 400 for facilitating improving behavioral skills of users, in accordance with some embodiments. Accordingly, at 402, the method 400 may include aggregating, using the processing device, the score corresponding to each of the at least one behavioral skill based on the generating of the score. Further, the aggregating may include summing the score corresponding to each of the at least one behavioral skill.

Further, at 404, the method 400 may include generating, using the processing device, an overall score for the at least one content based on the aggregating.

Further, at 406, the method 400 may include transmitting, using the communication device, the overall score to the at least one user device.

Further, at 408, the method 400 may include storing, using the storage device, the overall score.

Figure 5:
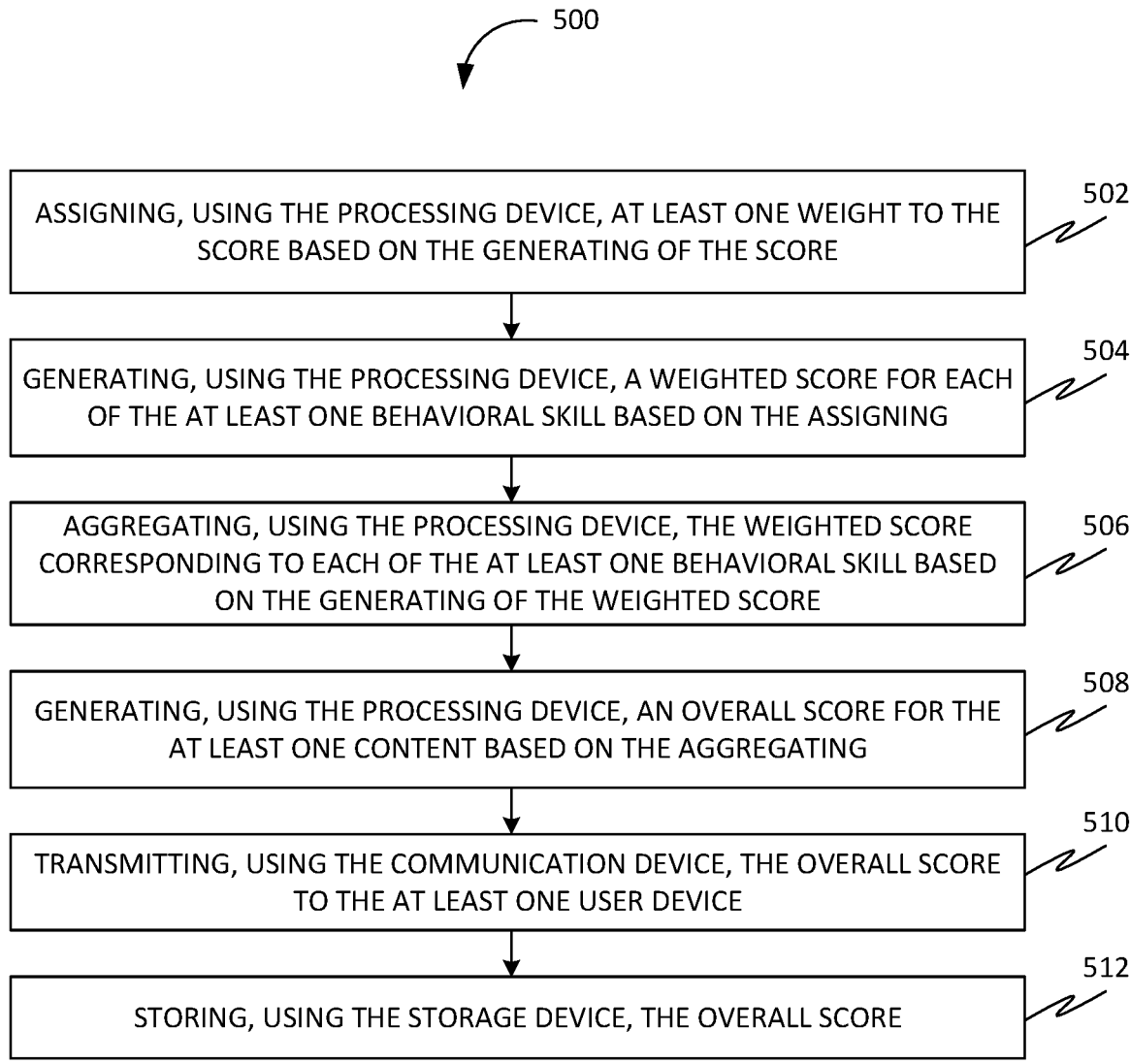
FIG. 5 is a flowchart of a method 500 for facilitating improving behavioral skills of users, in accordance with some embodiments.

FIG. 5 is a flowchart of a method 500 for facilitating improving behavioral skills of users, in accordance with some embodiments. Accordingly, at 502, the method 500 may include assigning, using the processing device, at least one weight to the score based on the generating of the score. Further, the assigning of the at least weight may be based on at least one criterion. Further, the at least one criterion may include a type of the at least one behavioral skill. Further, the assigning of the at least one weight may be based on a number of attributes of the at least one communication attribute of the plurality of communication attributes corresponding to each of the at least one behavioral skill.

Further, at 504, the method 500 may include generating, using the processing device, a weighted score for each of the at least one behavioral skill based on the assigning. Further, the generating of the weighted score may be based on multiplying the at least one weight with the score of each of the at least one behavioral skill.

Further, at 506, the method 500 may include aggregating, using the processing device, the weighted score corresponding to each of the at least one behavioral skill based on the generating of the weighted score. Further, the aggregating may include summing of the weighted score.

Further, at 508, the method 500 may include generating, using the processing device, an overall score for the at least one content based on the aggregating.

Further, at 510, the method 500 may include transmitting, using the communication device, the overall score to the at least one user device.

Further, at 512, the method 500 may include storing, using the storage device, the overall score.

Figure 6:
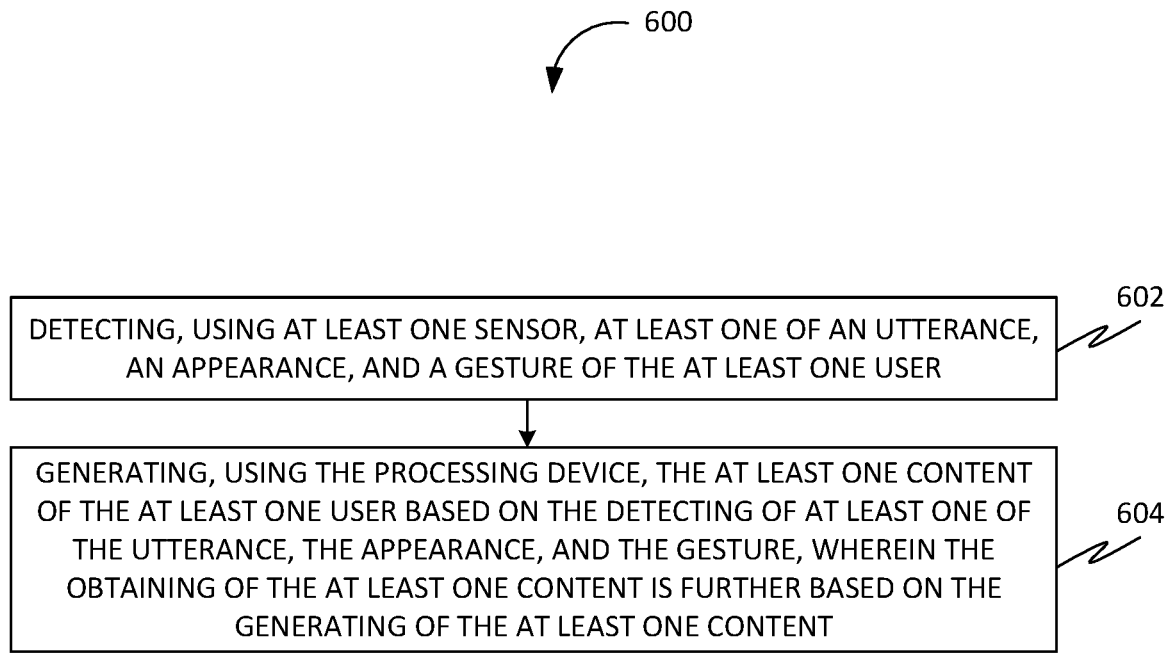
FIG. 6 is a flowchart of a method 600 for facilitating improving behavioral skills of users, in accordance with some embodiments.

FIG. 6 is a flowchart of a method 600 for facilitating improving behavioral skills of users, in accordance with some embodiments. Accordingly, at 602, the method 600 may include detecting, using at least one sensor, at least one of an utterance, an appearance, and a gesture of the at least one user. Further, the utterance may include a speech of the at least one user. Further, the appearance may include at least one visual characteristic of the at least one user. Further, the gesture may include a hand gesture, a hand movement, a body movement, a facial expression, a body position, etc. Further, the at least one sensor may include an image sensor, an audio sensor, a motion sensor, a gesture sensor, etc.

Further, at 604, the method 600 may include generating, using the processing device, the at least one content of the at least one user based on the detecting of at least one of the utterance, the appearance, and the gesture. Further, the obtaining of the at least one content may be based on the generating of the at least one content.

In further embodiments, the method 600 may include detecting, using at least one physiological sensor, at least one physiological parameter associated with the at least one user. Further, the generating of the at least one content of the at least one user may be based on the detecting of the at least one physiological parameter. Further, at least one physiological parameter includes a body temperature, breathing rate, heart rate, etc. Further, at least one physiological sensor includes a temperature sensor, a heart rate sensor, a blood oxygen sensor, etc.

Figure 7:
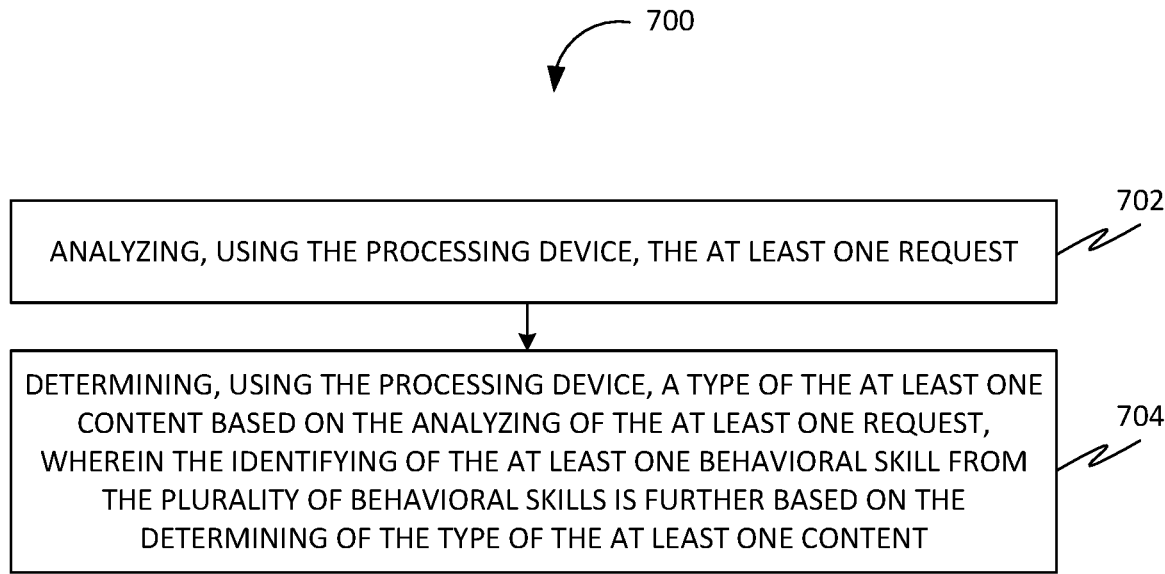
FIG. 7 is a flowchart of a method 700 for facilitating improving behavioral skills of users, in accordance with some embodiments.

FIG. 7 is a flowchart of a method 700 for facilitating improving behavioral skills of users, in accordance with some embodiments. Accordingly, at 702, the method 700 may include analyzing, using the processing device, the at least one request.

Further, at 704, the method 700 may include determining, using the processing device, a type of the at least one content based on the analyzing of the at least one request. Further, the type may include a presentation, a conferencing, a call, a pitch, etc. Further, the type may include an elevator pitch, an interview, a sales pitch, an interpersonal communication, a public speaking, an industry readiness, etc. Further, the identifying of the at least one behavioral skill from the plurality of behavioral skills may be based on the determining of the type of the at least one content.

Figure 8:
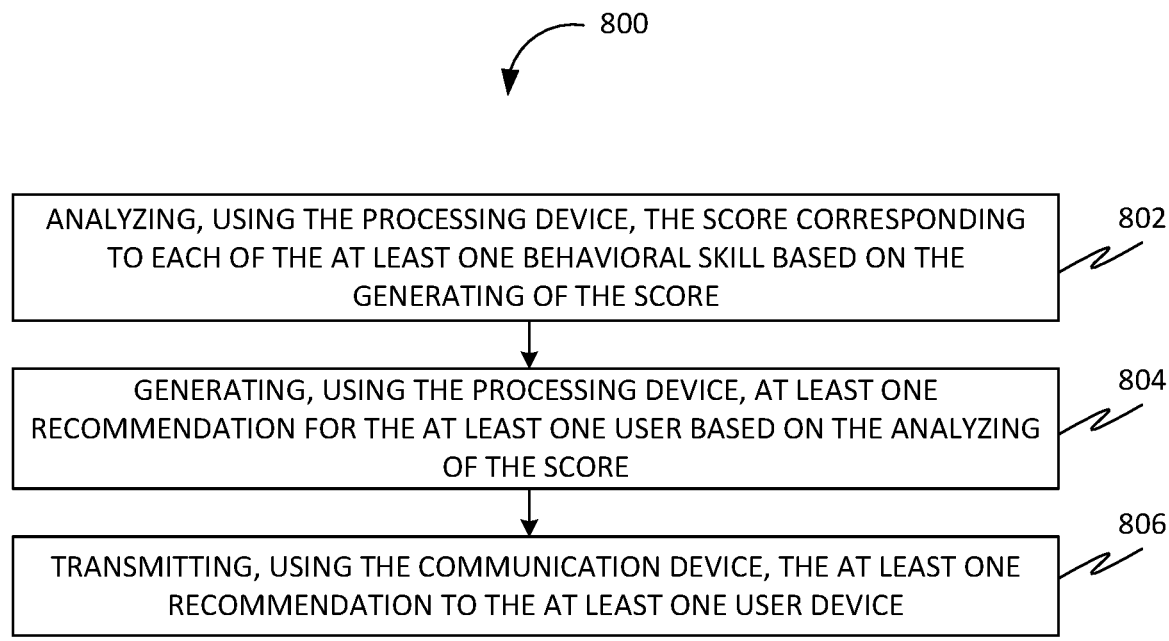
FIG. 8 is a flowchart of a method 800 for facilitating improving behavioral skills of users, in accordance with some embodiments.

FIG. 8 is a flowchart of a method 800 for facilitating improving behavioral skills of users, in accordance with some embodiments. Accordingly, at 802, the method 800 may include analyzing, using the processing device, the score corresponding to each of the at least one behavioral skill based on the generating of the score.

Further, at 804, the method 800 may include generating, using the processing device, at least one recommendation for the at least one user based on the analyzing of the score. Further, the at least one recommendation may include at least one instruction, at least one improvement, etc. associated with the at least one communication gesture exhibited by the at least one user in the at least one content.

Further, at 806, the method 800 may include transmitting, using the communication device, the at least one recommendation to the at least one user device.

Further, in some embodiments, the at least one recommendation may include at least one recommended communication attribute in the at least one content. Further, the method 800 may include analyzing, using the processing device, the at least one content and the at least one recommended communication attribute using at least one generative machine learning model. Further, the method 800 may include modifying, using the processing device, at least one of the one or more features in the at least one content using the at least one generative machine learning model. Further, the method 800 may include generating, using the processing device, at least one modified content using the at least one generative machine learning model based on the modifying. Further, the method 800 may include transmitting, using the communication device, the at least one modified content to the at least one user device. Further, the at least one generative machine learning model may include a trained generative adversarial network (GAN) or a variational autoencoder (VAE).

Figure 9:
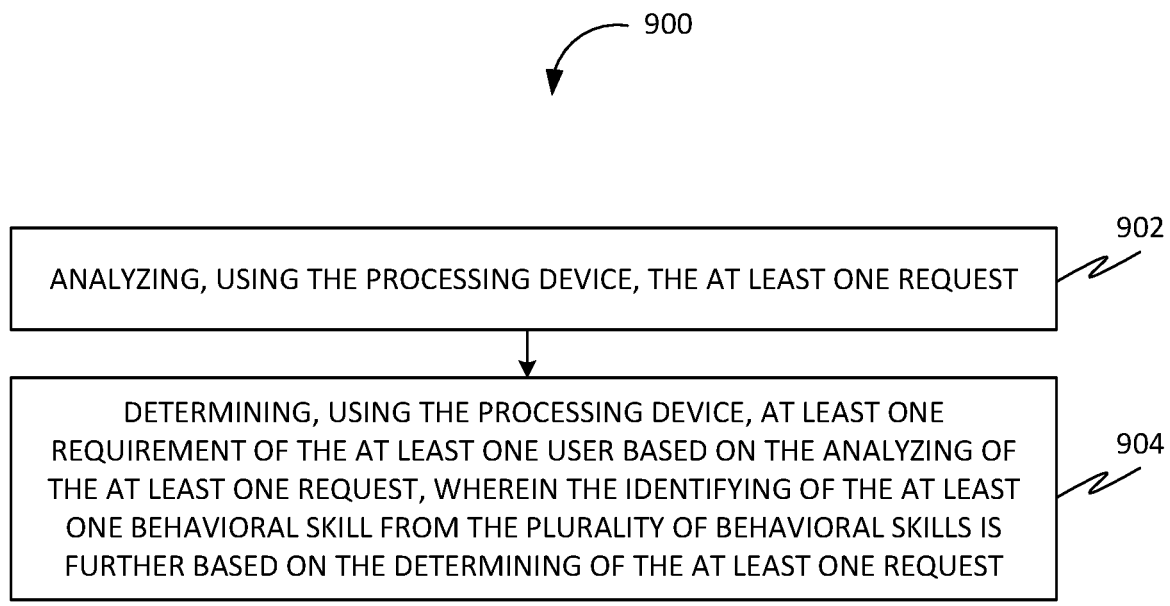
FIG. 9 is a flowchart of a method 900 for facilitating improving behavioral skills of users, in accordance with some embodiments.

FIG. 9 is a flowchart of a method 900 for facilitating improving behavioral skills of users, in accordance with some embodiments. Accordingly, at 902, the method 900 may include analyzing, using the processing device, the at least one request.

Further, at 904, the method 900 may include determining, using the processing device, at least one requirement of the at least one user based on the analyzing of the at least one request. Further, the at least one requirement may include a role played by the at least one user. Further, the at least one role may include a sales representative, a customer service representative, a marketing specialist, a manager, a consultant, a negotiator, an interviewee, etc. Further, the identifying of the at least one behavioral skill from the plurality of behavioral skills may be based on the determining of the at least one request.

Figure 10:
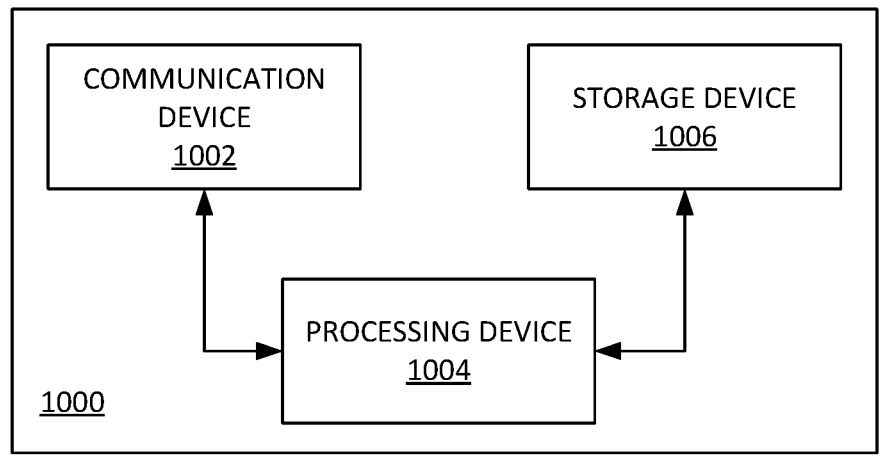
FIG. 10 is a block diagram of a system 1000 for facilitating improving behavioral skills of users, in accordance with some embodiments.

FIG. 10 is a block diagram of a system 1000 for facilitating improving behavioral skills of users, in accordance with some embodiments. Accordingly, the system 1000 may include a communication device 1002, a processing device 1004, and a storage device 1006.

Figure 11:
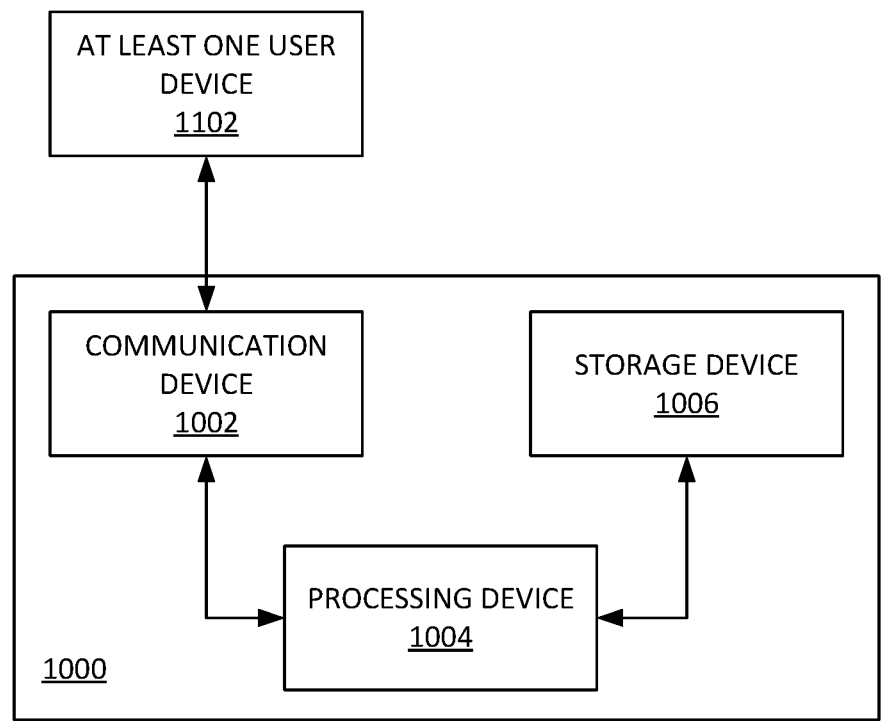
FIG. 11 is a block diagram of the system 1000, in accordance with some embodiments.

Further, the communication device 1002 may be configured for receiving at least one request from at least one user device 1102, as shown in FIG. 11, associated with at least one user. Further, the communication device 1002 may be configured for transmitting a score to the at least one user device 1102.

Further, the processing device 1004 may be communicatively coupled with the communication device 1002. Further, the processing device 1004 may be configured for obtaining at least one content associated with the at least one user based on the at least one request. Further, the processing device 1004 may be configured for analyzing the at least one content using a plurality of machine learning models. Further, the plurality of machine learning models may be configured for determining a plurality of communication attributes associated with the at least one user from the at least one content. Further, the plurality of communication attributes may include a smile gesture, an eye contact gesture, a speech pitch, a speech volume, a speech pace, a speech pause, and a sentiment. Further, the processing device 1004 may be configured for identifying at least one behavioral skill from a plurality of behavioral skills based on the determining of the plurality of communication attributes. Further, each of the at least one behavioral skill corresponds to at least one communication attribute of the plurality of communication attributes. Further, the processing device 1004 may be configured for generating the score corresponding to each of the at least one behavioral skill based on the determining of the plurality of communication attributes and the identifying.

Further, the storage device 1006 may be communicatively coupled with the processing device 1004. Further, the storage device 1006 may be configured for storing the score.

Further, in some embodiments, the plurality of machine learning models may be configured for determining at least one characteristic of each of the plurality of communication attributes from the at least one content. Further, the processing device 1004 may be configured for determining a level associated with each of the at least one communication attribute corresponding to each of the at least one behavioral skill based on the determining of the plurality of communication attributes and the determining of the at least one characteristic of each of the plurality of communication attributes. Further, the processing device 1004 may be configured for comparing the level of each of the at least one communication attribute of each of the at least one behavioral skill with a proficiency level for each of the at least one communication attribute. Further, the generating of the score may be based on the comparing.

Further, in some embodiments, the processing device 1004 may be configured for aggregating the score corresponding to each of the at least one behavioral skill based on the generating of the score. Further, the processing device 1004 may be configured for generating an overall score for the at least one content based on the aggregating. Further, the communication device 1002 may be configured for transmitting the overall score to the at least one user device 1102. Further, the storage device 1006 may be configured for storing the overall score.

Further, in some embodiments, the processing device 1004 may be configured for assigning at least one weight to the score based on the generating of the score. Further, the processing device 1004 may be configured for generating a weighted score for each of the at least one behavioral skill based on the assigning. Further, the processing device 1004 may be configured for aggregating the weighted score corresponding to each of the at least one behavioral skill based on the generating of the weighted score. Further, the processing device 1004 may be configured for generating an overall score for the at least one content based on the aggregating. Further, the communication device 1002 may be configured for transmitting the overall score to the at least one user device 1102. Further, the storage device 1006 may be configured for storing the overall score.

Figure 12:
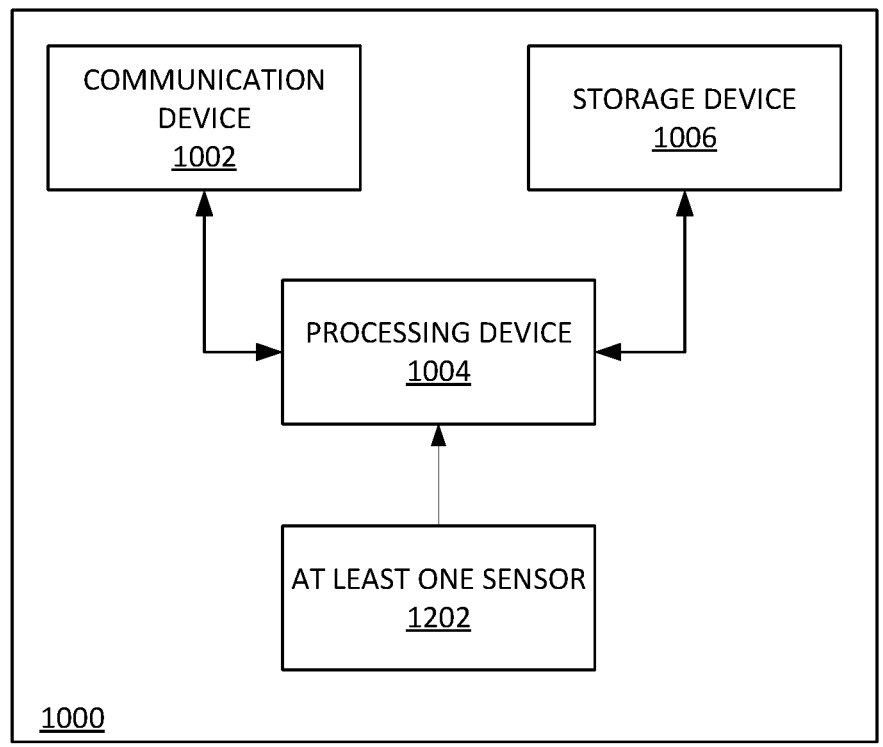
FIG. 12 is a block diagram of the system 1000, in accordance with some embodiments.

In further embodiments, the system 1000 may include at least one sensor 1202, as shown in FIG. 12. Further, the at least one sensor 1202 may be communicatively coupled with the processing device 1004. Further, the at least one sensor 1202 may be configured for detecting at least one of an utterance, an appearance, and a gesture of the at least one user. Further, the processing device 1004 may be configured for generating the at least one content of the at least one user based on the detecting of at least one of the utterance, the appearance, and the gesture. Further, the obtaining of the at least one content may be based on the generating of the at least one content.

Figure 13:
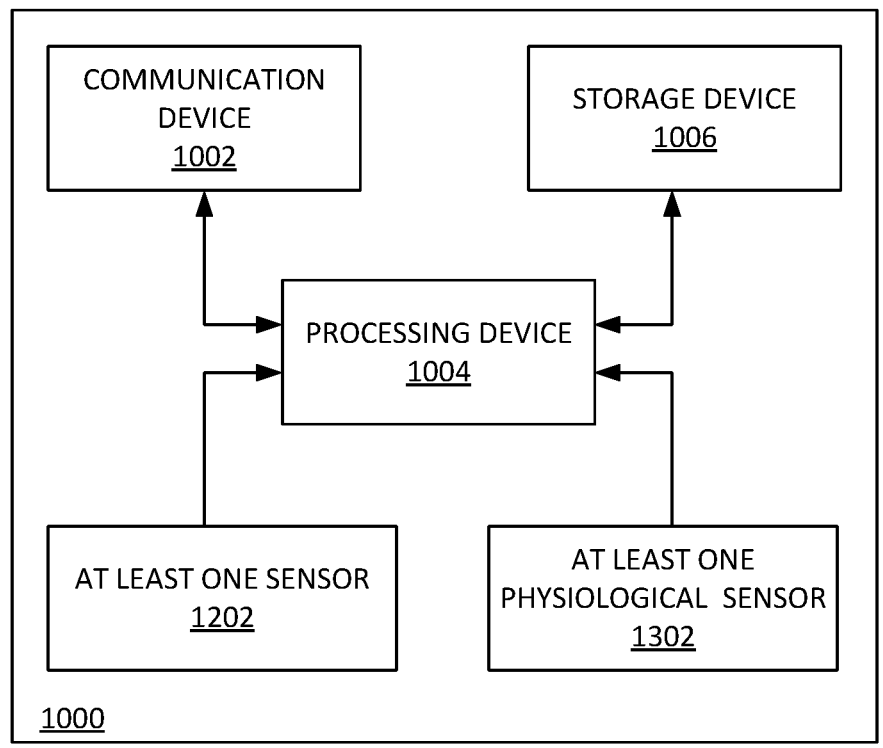
FIG. 13 is a block diagram of the system 1000, in accordance with some embodiments.

In an embodiment, the system 1000 may include at least one physiological sensor 1302, as shown in FIG. 13. Further, the at least one physiological sensor 1302 may be communicatively coupled with the processing device 1004. Further, the at least one physiological sensor 1302 may be configured for detecting at least one physiological parameter associated with the at least one user. Further, the generating of the at least one content of the at least one user may be based on the detecting of the at least one physiological parameter.

Further, in some embodiments, the processing device 1004 may be configured for analyzing the at least one request. Further, the processing device 1004 may be configured for determining a type of the at least one content based on the analyzing of the at least one request. Further, the identifying of the at least one behavioral skill from the plurality of behavioral skills may be based on the determining of the type of the at least one content.

Further, in some embodiments, the processing device 1004 may be configured for analyzing the score corresponding to each of the at least one behavioral skill based on the generating of the score. Further, the processing device 1004 may be configured for generating at least one recommendation for the at least one user based on the analyzing of the score. Further, the communication device 1002 may be configured for transmitting the at least one recommendation to the at least one user device 1102.

Further, in some embodiments, the processing device 1004 may be configured for analyzing the at least one request. Further, the processing device 1004 may be configured for determining at least one requirement of the at least one user based on the analyzing of the at least one request. Further, the identifying of the at least one behavioral skill from the plurality of behavioral skills may be based on the determining of the at least one request.

Further, in some embodiments, the plurality of machine learning models may include a first machine learning model, a second machine learning model, a third machine learning model, and a fourth machine learning model. Further, the first machine learning model may be associated with a Google cloud video intelligence. Further, the second machine learning model may be associated with a praat parselmouth. Further, the third machine learning model may be associated with Amazon Web Service (AWS) speech-totext. Further, the fourth machine learning model may be associated with Amazon Web Service (AWS) comprehend. Further, the first machine learning model may be configured for determining the smile gesture and the eye contact gesture from the at least one content. Further, the second machine learning model may be configured for determining the speech pitch, the speech volume, and the speech pace from the at least one content. Further, the third machine learning model may be configured for determining the speech pace from the at least one content. Further, the third machine learning model and the fourth machine learning model may be configured for determining the sentiment from the at least one content. Further, the determining of the plurality of communication attributes may be based on the determining of the smile gesture and the eye contact gesture, the determining of the speech pitch, the speech volume, and the speech pace, the determining of the speech pace, and the determining of the sentiment.

FIG. 11 is a block diagram of the system 1000, in accordance with some embodiments.

FIG. 12 is a block diagram of the system 1000, in accordance with some embodiments.

FIG. 13 is a block diagram of the system 1000, in accordance with some embodiments.

Figure 14:
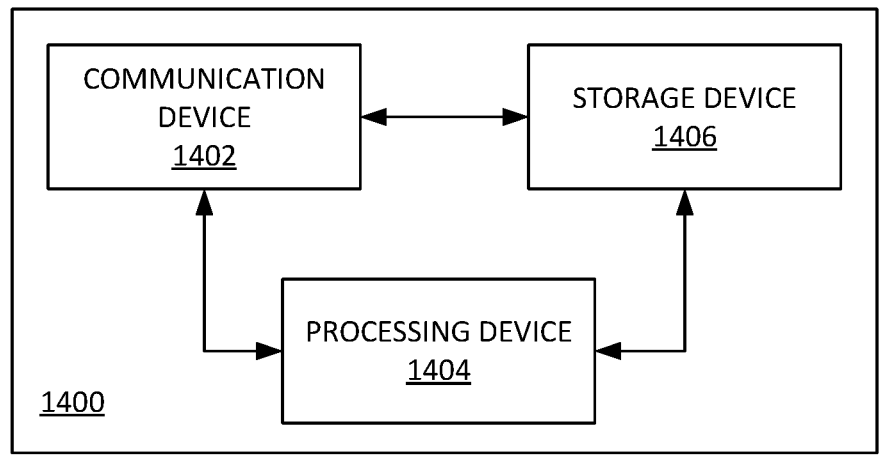
FIG. 14 is a block diagram of a system 1400 of facilitating improvements in behavioral skills using communication attributes, non-verbal cues, and sentiments, in accordance with some embodiments.

FIG. 14 is a block diagram of a system 1400 of facilitating improvements in behavioral skills using communication attributes, non-verbal cues, and sentiments, in accordance with some embodiments. Accordingly, the system 1400 comprises a communication device 1402 configured for receiving a request from at least one user device associated with at least one user. Further, at least one user includes an individual, an institution, and an organization. Further, at least one user device includes phones, laptops, IoT devices, virtual servers, cloud servers, etc. Further, the request may indicate that at least one user may want to determine behavioral skills. Further, the request includes user data such as name, an email address, a residential address, an identity information, etc. Further, the communication device 1402 is configured for receiving at least one user behavior media from at least one user device. Further, the communication device 1402 is configured for transmitting a behavioral skill report to at least one user device.

Further, the system 1400 comprises a processing device 1404 configured for generating a user account based on the user data. Further, the user account may be associated with a user profile. Further, the processing device 1404 is configured for analyzing at least one user behavior media. Further, the processing device 1404 is configured for determining at least one communication attribute, non-verbal cue, and sentiment based on the analysis. Further, at least one communication attribute, non-verbal cue, and sentiment comprise a speech rate, pauses, volume, filler words, words that are being repeated, eye contact, smile, and positive or negative sentiment. Further, the processing device 1404 is configured for processing at least one communication attribute, non-verbal cue, and sentiment using at least one Artificial Intelligence or Machine Learning model. Further, the processing device 1404 is configured for generating the behavioral skill report based on the processing. Further, the behavioral skill report includes insights corresponding to behavior of at least one user based on a plurality of behavioral skills. Further, the behavioral skill report includes a score corresponding to the plurality of behavioral skills.

Further, the system 1400 comprises a storage device 1406 configured for storing the request and the behavioral skill report.

Figure 15:
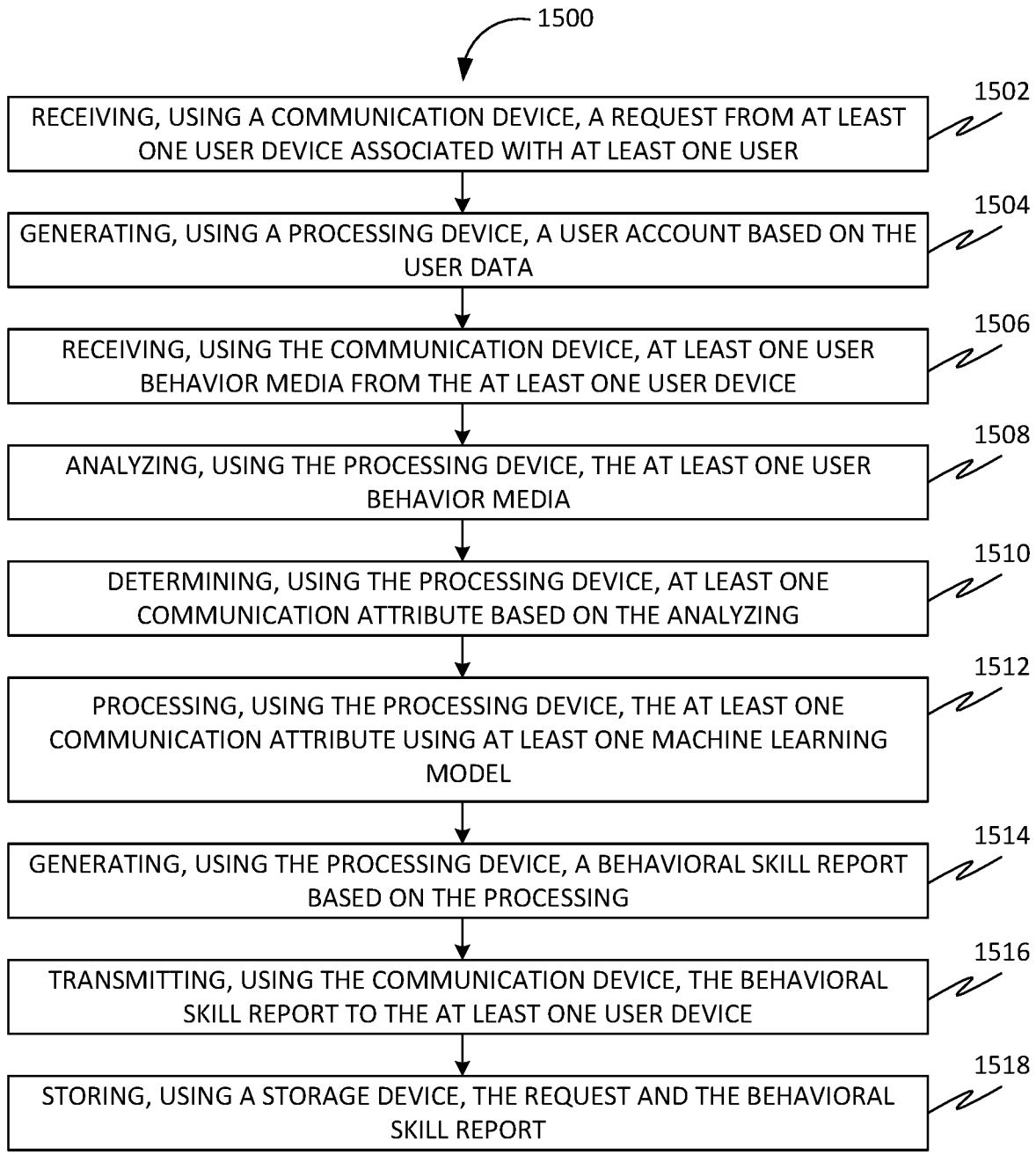
FIG. 15 is a flow chart of a method 1500 of facilitating improvements in behavioral skills using communication attributes, non-verbal cues, and sentiments, in accordance with some embodiments.

FIG. 15 is a flow chart of a method 1500 of facilitating improvements in behavioral skills using communication attributes, non-verbal cues, and sentiments, in accordance with some embodiments. Accordingly, at 1502, the method 1500 may include receiving, using a communication device, a request from at least one user device associated with at least one user. Further, at least one user includes an individual, an institution, and an organization. Further, at least one user device includes phones, laptops, IoT devices, virtual servers, cloud servers, etc. Further, the request indicates that at least one user may want to determine behavioral skills. Further, the request may include user data such as name, an email address, a residential address, an identity information, etc. Further, in an instance, at least one user may include a student, a working professional, or an unemployed person.

Further, at 1504, the method 1500 may include generating, using a processing device, a user account based on the user data. Further, the user account may be associated with a user profile.

Further, at 1506, the method 1500 may include receiving, using the communication device, at least one user behavior media from at least one user device. Further, at least one user behavior media may include an audio, a video, an audio-video content, etc. Further, in an instance, at least one user behavior media may include selfie videos, recorded live videos, a pre-recorded video, etc.

Further, at 1508, the method 1500 may include analyzing, using the processing device, at least one user behavior media.

Further, at 1510, the method 1500 may include determining, using the processing device, at least one communication attribute based on the analysis. Further, at least one communication attribute, non-verbal cue, and sentiment may include a speech rate, pauses, volume, filler words, words that are being repeated, eye contact, smile, and positive or negative sentiment.

Further, at 1512, the method 1500 may include processing, using the processing device, at least one communication attribute, non-verbal cue, and sentiment using at least one Artificial Intelligence of Machine Learning model.

Further, at 1514, the method 1500 may include generating, using the processing device, a behavioral skill report based on the processing. Further, the behavioral skill report includes insights corresponding to behavior of at least one user based on a plurality of behavioral skills. Further, the behavioral skill report includes a score corresponding to the plurality of behavioral skills.

Further, at 1516, the method 1500 may include transmitting, using the communication device, the behavioral skill report to at least one user device.

Further, at 1518, the method 1500 may include storing, using a storage device, the request and the behavioral skill report.

Further, in some embodiments, the method 1500 may include analyzing, using the processing device, the behavioral skill report using at least one second Artificial Intelligence or Machine Learning model. Further, the method 1500 may include generating, using the processing device, at least one recommendation based on the analysis of the behavioral media recorded live or uploaded by the user. Further, at least one recommendation may provide instructions and/or measures to improve the behavioral skills of at least one user. Further, at least one recommendation may allow faster development of the behavioral skills of at least one user. Further, at least one recommendation comprises a video, a practice set, an audio, an audio-video, etc. Further, the method 1500 may include transmitting, using the communication device, at least one recommendation to at least one user device. Further, the method 1500 may include storing, using a storage device, at least one recommendation.

Further, in some embodiments, the method 1500 may include receiving, using the communication device, at least one physiological data from at least one input device. Further, at least one input device comprises a smartwatch or a wearable device. Further, at least one input device includes at least one physiological sensor configured for generating at least one physiological data based on detecting a value corresponding to at least one physiological parameter. Further, at least one physiological parameter includes a body temperature, breathing rate, heart rate, etc. Further, at least one physiological sensor includes a temperature sensor, a heart rate sensor, a blood oxygen sensor, etc. Further, the method 1500 may include analyzing, using the processing device, at least one physiological data. Further, the method 1500 may include determining, using the processing device, at least one physiological parameter based on the analysis of at least one physiological data. Further, the generation of the behavioral skill report may be based on at least one physiological parameter. Further, the method 1500 may include storing, using the storage device, at least one physiological parameter and at least one physiological data.

FIG. 16 illustrates a first portion of an EdMyst periodic table 1600 associated with a software application (EdMyst) for facilitating improving behavioral skills of users, in accordance with some embodiments. Accordingly, the EdMyst periodic table 1600 may include the behavioral skills that may be detectable by the software application (EdMyst).

FIG. 17 illustrates a second portion of the EdMyst periodic table 1600, in accordance with some embodiments. Further, the EdMyst periodic table 1600 displays 29 machine detectable behavioral skills which include 21 personal behavioral skills and 8 interpersonal behavioral skills.

Figure 18:
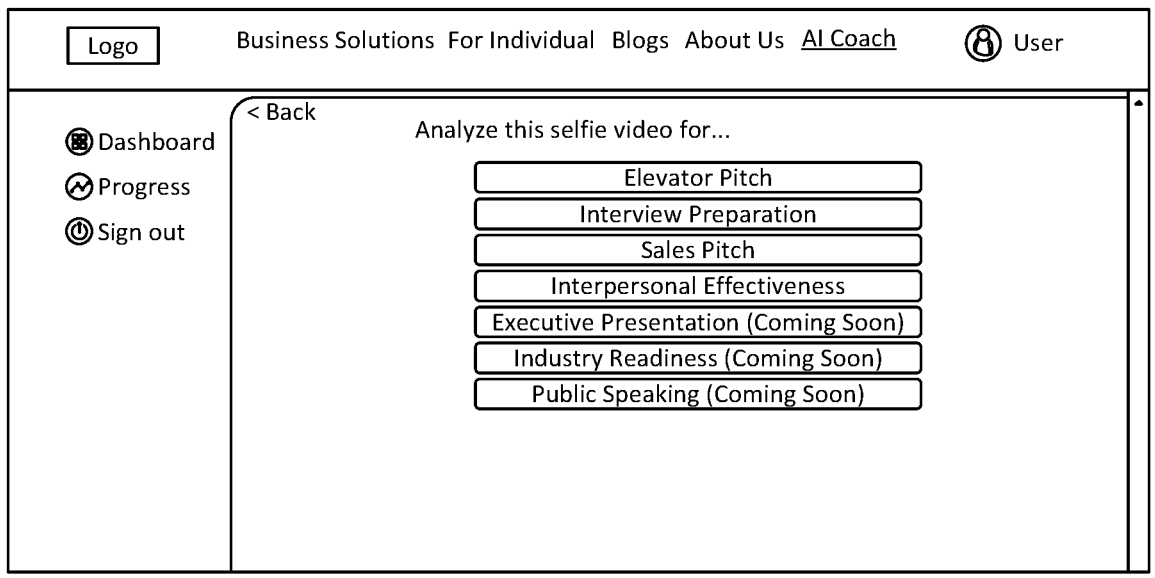
FIG. 18 is a screenshot of a user interface 1800 associated with the software application (EdMyst), in accordance with some embodiments.

FIG. 18 is a screenshot of a user interface 1800 associated with the software application (EdMyst), in accordance with some embodiments. Accordingly, the user interface 1800 may include options for analyzing at least one content.

Figure 19:
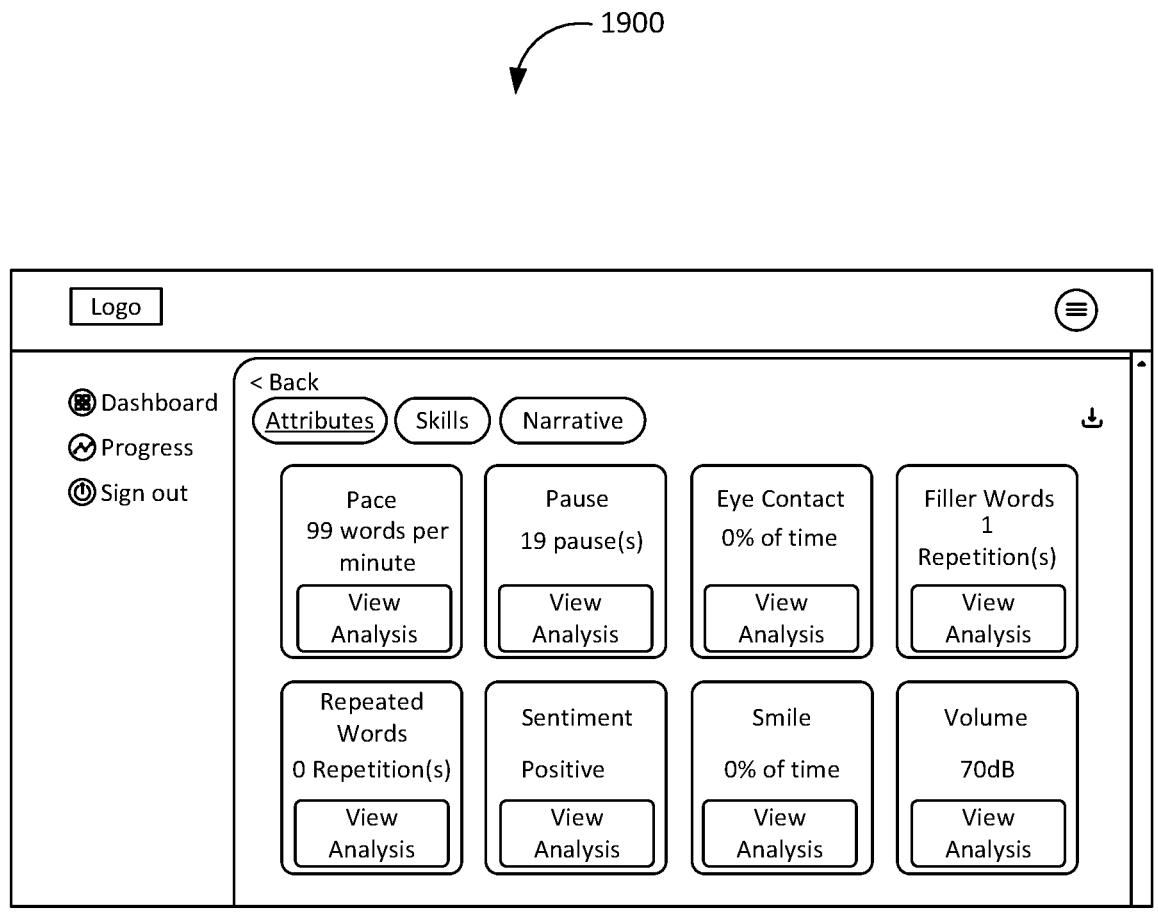
FIG. 19 is a screenshot of a user interface 1900 associated with the software application (EdMyst), in accordance with some embodiments.

FIG. 19 is a screenshot of a user interface 1900 associated with the software application (EdMyst), in accordance with some embodiments. Accordingly, the user interface 1900 may display one or more communication attributes.

Figure 20:
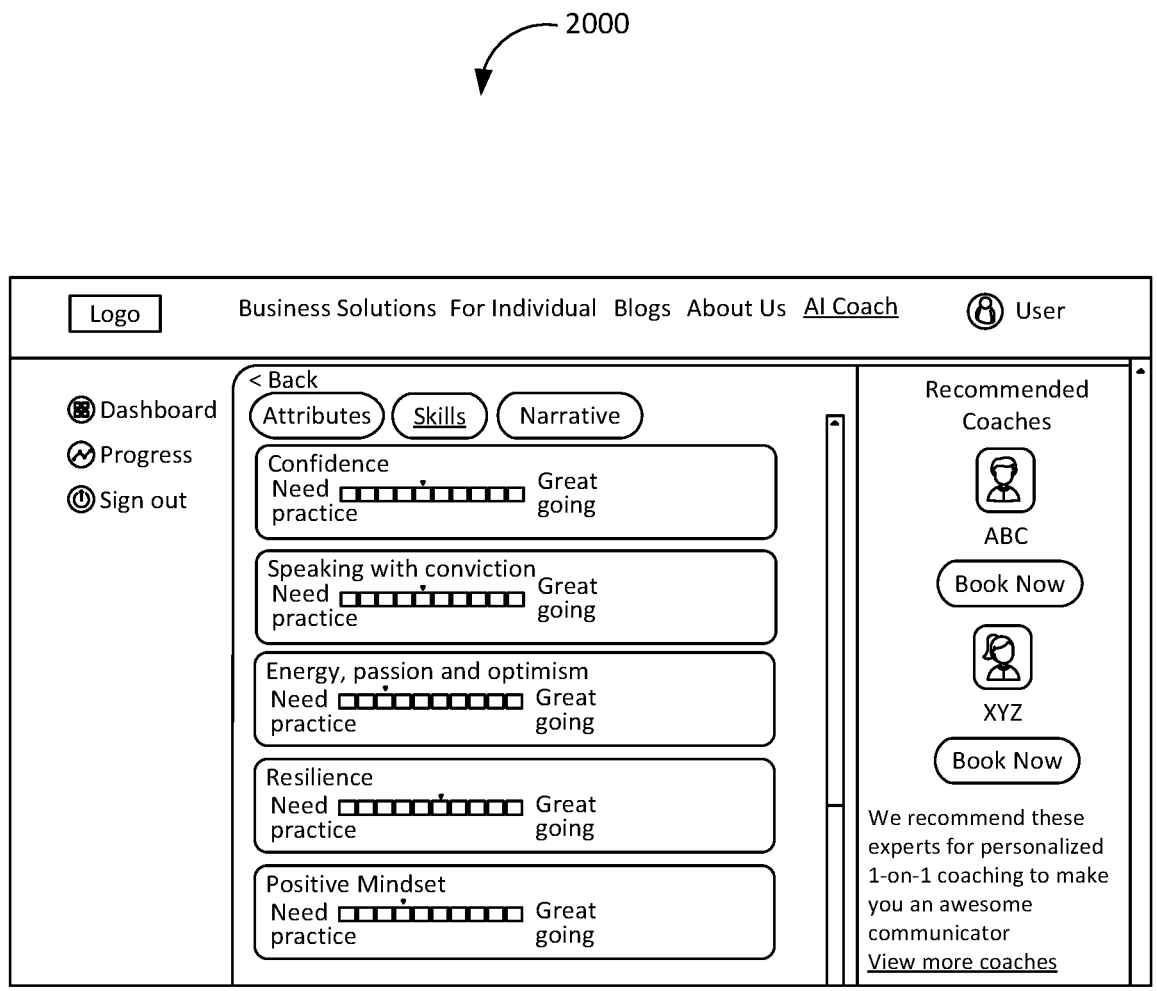
FIG. 20 is a screenshot of a user interface 2000 associated with the software application (EdMyst), in accordance with some embodiments.

FIG. 20 is a screenshot of a user interface 2000 associated with the software application (EdMyst), in accordance with some embodiments. Accordingly, the user interface 2000 may display behavioral skills and scores corresponding to the behavioral skills.

Figure 21:
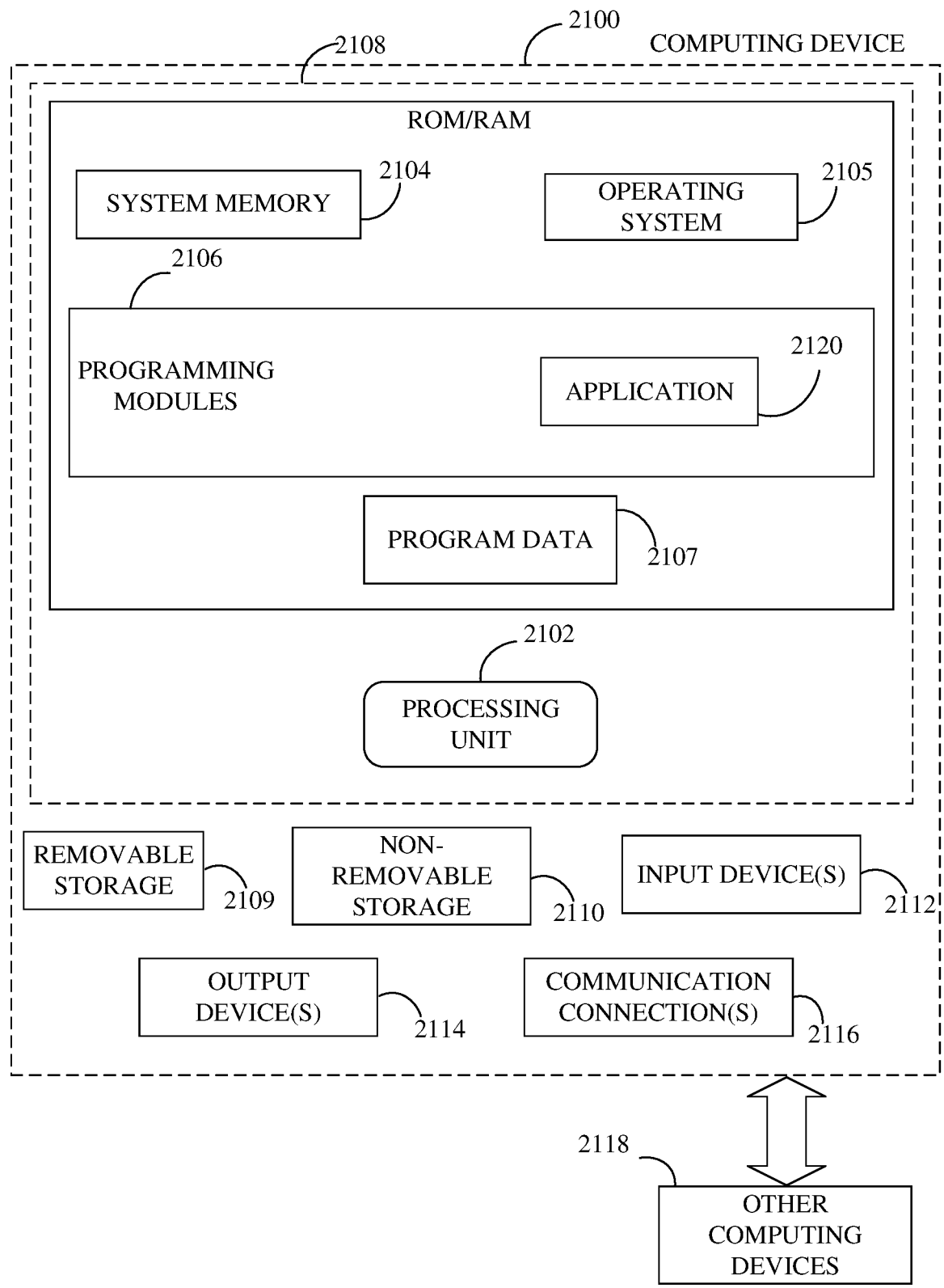
FIG. 21 is a block diagram of a computing device for implementing the methods disclosed herein, in accordance with some embodiments.

With reference to FIG. 21, a system consistent with an embodiment of the disclosure may include a computing device or cloud service, such as computing device 2100. In a basic configuration, computing device 2100 may include at least one processing unit 2102 and a system memory 2104. Depending on the configuration and type of computing device, system memory 2104 may comprise, but is not limited to, volatile (e.g. random-access memory (RAM)), non-volatile (e.g. read-only memory (ROM)), flash memory, or any combination. System memory 2104 may include operating system 2105, one or more programming modules 2106, and may include a program data 2107. Operating system 2105, for example, may be suitable for controlling computing device 2100's operation. In one embodiment, programming modules 2106 may include image-processing module, sound processing module, and machine learning module. Furthermore, embodiments of the disclosure may be practiced in conjunction with a graphics library, other operating systems, or any other application program and is not limited to any particular application or system. This basic configuration is illustrated in FIG. 21 by those components within a dashed line 2108.

Computing device 2100 may have additional features or functionality. For example, computing device 2100 may also include additional data storage devices (removable and/or non-removable) such as, for example, magnetic disks, optical disks, or tape. Such additional storage is illustrated in FIG. 21 by a removable storage 2109 and a non-removable storage 2110. Computer storage media may include volatile and non-volatile, removable and non-removable media implemented in any method or technology for storage of information, such as computer-readable instructions, data structures, program modules, or other data. System memory 2104, removable storage 2109, and non-removable storage 2110 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 2100. Any such computer storage media may be part of device 2100. Computing device 2100 may also have input device(s) 2112 such as a keyboard, a mouse, a pen, a sound input device, a touch input device, a location sensor, a camera, a biometric sensor, etc. Output device(s) 2114 such as a display, speakers, a printer, etc. may also be included. The aforementioned devices are examples and others may be used.

Computing device 2100 may also contain a communication connection 2116 that may allow device 2100 to communicate with other computing devices 2118, such as over a network in a distributed computing environment, for example, an intranet or the Internet. Communication connection 2116 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 2104, including operating system 2105. While executing on processing unit 2102, programming modules 2106 (e.g., application 2120 such as a media player) may perform processes including, for example, one or more stages of methods, algorithms, systems, applications, servers, databases as described above. The aforementioned process is an example, and processing unit 2102 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

What is claimed is:

1. A method for facilitating improving behavioral skills of users, the method comprising:
receiving, using a communication device, at least one request from at least one user device associated with at least one user;
obtaining, using a processing device, at least one content associated with the at least one user based on the at least one request;
analyzing, using the processing device, the at least one content using a plurality of machine learning models, wherein the plurality of machine learning models is configured for determining a plurality of communication attributes associated with the at least one user from the at least one content, wherein the plurality of communication attributes comprises a smile gesture, an eye contact gesture, a speech pitch, a speech volume, a speech pace, a speech pause, and a sentiment;
identifying, using the processing device, at least one behavioral skill from a plurality of behavioral skills based on the determining of the plurality of communication attributes, wherein the identifying of the at least one behavioral skill comprises translating at least one of the plurality of communication attributes to the at least one behavioral skill, wherein each of the at least one behavioral skill corresponds to at least one communication attribute of the plurality of communication attributes;
generating, using the processing device, a score corresponding to each of the at least one behavioral skill based on the determining of the plurality of communication attributes and the identifying;
analyzing, using the processing device, the score corresponding to each of the at least one behavioral skill based on the generating of the score;
generating, using the processing device, at least one recommendation for the at least one user based on the analyzing of the score, wherein the at least one recommendation comprises at least one recommended communication attribute in the at least one content;

analyzing, using the processing device, the at least one content and the at least one recommended communication attribute using at least one generative machine learning model, wherein the at least one generative machine learning model comprises at least one of a trained generative adversarial network (GAN) and a trained variational autoencoder (VAE);

modifying, using the processing device, at least one of one or more features in the at least one content using the at least one generative machine learning model;

generating, using the processing device, at least one modified content using the at least one generative machine learning model based on the modifying;

transmitting, using the communication device, the at least one recommendation and the at least one modified content to the at least one user device;

transmitting, using the communication device, the score to the at least one user device; and storing, using a storage device, the score.

2. The method of claim 1, wherein the plurality of machine learning models may be further configured for determining at least one characteristic of each of the plurality of communication attributes from the at least one content, wherein the method further comprises:

determining, using the processing device, a level associated with each of the at least one communication attribute corresponding to each of the at least one behavioral skill based on the determining of the plurality of communication attributes and the determining of the at least one characteristic of each of the plurality of communication attributes; and comparing, using the processing device, the level of each of the at least one communication attribute of each of the at least one behavioral skill with a proficiency level for each of the at least one communication attribute, wherein the generating of the score is further based on the comparing.

3. The method of claim 1 further comprising:

aggregating, using the processing device, the score corresponding to each of the at least one behavioral skill based on the generating of the score;

generating, using the processing device, an overall score for the at least one content based on the aggregating;

transmitting, using the communication device, the overall score to the at least one user device; and storing, using the storage device, the overall score.

4. The method of claim 1 further comprising:

assigning, using the processing device, at least one weight to the score based on the generating of the score, wherein the assigning of the at least one weight to the score is further based on at least one of a type of a behavioral skill associated with the score, and a number of the at least one communication attribute of the plurality of communication attributes corresponding to the behavioral skill;

generating, using the processing device, a weighted score for each of the at least one behavioral skill based on the assigning;

aggregating, using the processing device, the weighted score corresponding to each of the at least one behavioral skill based on the generating of the weighted score;

generating, using the processing device, an overall score for the at least one content based on the aggregating;

transmitting, using the communication device, the overall score to the at least one user device; and storing, using the storage device, the overall score.

5. The method of claim 1 further comprising:

detecting, using at least one sensor, at least one of an utterance, an appearance, and a gesture of the at least one user; and generating, using the processing device, the at least one content of the at least one user based on the detecting of at least one of the utterance, the appearance, and the gesture, wherein the obtaining of the at least one content is further based on the generating of the at least one content.

6. The method of claim 5 further comprising detecting, using at least one physiological sensor, at least one physiological parameter associated with the at least one user, wherein the generating of the at least one content of the at least one user is based on the detecting of the at least one physiological parameter.

7. The method of claim 1 further comprising:

analyzing, using the processing device, the at least one request; and determining, using the processing device, a type of the at least one content based on the analyzing of the at least one request, wherein the identifying of the at least one behavioral skill from the plurality of behavioral skills is further based on the determining of the type of the at least one content.

8. The method of claim 1 further comprising:

analyzing, using the processing device, the at least one request; and determining, using the processing device, at least one requirement of the at least one user based on the analyzing of the at least one request, wherein the identifying of the at least one behavioral skill from the plurality of behavioral skills is further based on the determining of the at least one request.

9. The method of claim 1, wherein the plurality of machine learning models comprises a first machine learning model, a second machine learning model, a third machine learning model, and a fourth machine learning model, wherein the first machine learning model is associated with a Google cloud video intelligence, wherein the second machine learning model is associated with a praat parselmouth, wherein the third machine learning model is associated with Amazon Web Service (AWS) speech-to-text, wherein the fourth machine learning model is associated with Amazon Web Service (AWS) comprehend, wherein the first machine learning model is configured for determining the smile gesture and the eye contact gesture from the at least one content, wherein the second machine learning model is configured for determining the speech pitch, the speech volume, and the speech pace from the at least one content, wherein the third machine learning model is configured for determining the speech pace from the at least one content, wherein the third machine learning model and the fourth machine learning model are configured for determining the sentiment from the at least one content, wherein the determining of the plurality of communication attributes is further based on the determining of the smile gesture and the eye contact gesture, the determining of the speech pitch, the speech volume, and the speech pace, the determining of the speech pace, and the determining of the sentiment.

10. A system for facilitating improving behavioral skills of users, the system comprising:

a communication device configured for:

receiving at least one request from at least one user device associated with at least one user;

transmitting at least one recommendation and at least one modified content to the at least one user device; and transmitting a score to the at least one user device;

a processing device comprising one or more processors communicatively coupled with the communication device, wherein the processing device is configured for:

obtaining at least one content associated with the at least one user based on the at least one request;

analyzing the at least one content using a plurality of machine learning models, wherein the plurality of machine learning models is configured for determining a plurality of communication attributes associated with the at least one user from the at least one content, wherein the plurality of communication attributes comprises a smile gesture, an eye contact gesture, a speech pitch, a speech volume, a speech pace, a speech pause, and a sentiment;

identifying at least one behavioral skill from a plurality of behavioral skills based on the determining of the plurality of communication attributes, wherein the identifying of the at least one behavioral skill comprises translating at least one of the plurality of communication attributes to the at least one behavioral skill, wherein each of the at least one behavioral skill corresponds to at least one communication attribute of the plurality of communication attributes;

generating the score corresponding to each of the at least one behavioral skill based on the determining of the plurality of communication attributes and the identifying;

analyzing the score corresponding to each of the at least one behavioral skill based on the generating of the score;

generating the at least one recommendation for the at least one user based on the analyzing of the score, wherein the at least one recommendation comprises at least one recommended communication attribute in the at least one content;

analyzing the at least one content and the at least one recommended communication attribute using at least one generative machine learning model, wherein the at least one generative machine learning model comprises at least one of a trained generative adversarial network (GAN) and a trained variational autoencoder (VAE);

modifying at least one of one or more features in the at least one content using the at least one generative machine learning model; and generating the at least one modified content using the at least one generative machine learning model based on the modifying; and a storage device communicatively coupled with the processing device, wherein the storage device is configured for storing the score.

11. The system of claim 10, wherein the plurality of machine learning models may be further configured for determining at least one characteristic of each of the plurality of communication attributes from the at least one content, wherein the processing device is further configured for:

determining a level associated with each of the at least one communication attribute corresponding to each of the at least one behavioral skill based on the determining of the plurality of communication attributes and the determining of the at least one characteristic of each of the plurality of communication attributes; and comparing the level of each of the at least one communication attribute of each of the at least one behavioral skill with a proficiency level for each of the at least one communication attribute, wherein the generating of the score is further based on the comparing.

12. The system of claim 10, wherein the processing device is further configured for:

aggregating the score corresponding to each of the at least one behavioral skill based on the generating of the score; and generating an overall score for the at least one content based on the aggregating, wherein the communication device is further configured for transmitting the overall score to the at least one user device, wherein the storage device is further configured for storing the overall score.

13. The system of claim 10, wherein the processing device is further configured for:

assigning at least one weight to the score based on the generating of the score, wherein the assigning of the at least one weight to the score is further based on at least one of a type of a behavioral skill associated with the score, and a number of the at least one communication attribute of the plurality of communication attributes corresponding to the behavioral skill;

generating a weighted score for each of the at least one behavioral skill based on the assigning;

aggregating the weighted score corresponding to each of the at least one behavioral skill based on the generating of the weighted score; and generating an overall score for the at least one content based on the aggregating, wherein the communication device is further configured for transmitting the overall score to the at least one user device, wherein the storage device is further configured for storing the overall score.

14. The system of claim 10 further comprising at least one sensor communicatively coupled with the processing device, wherein the at least one sensor is configured for detecting at least one of an utterance, an appearance, and a gesture of the at least one user, wherein the processing device is further configured for generating the at least one content of the at least one user based on the detecting of at least one of the utterance, the appearance, and the gesture, wherein the obtaining of the at least one content is further based on the generating of the at least one content.

15. The system of claim 14 further comprising at least one physiological sensor communicatively coupled with the processing device, wherein the at least one physiological sensor is configured for detecting at least one physiological parameter associated with the at least one user, wherein the generating of the at least one content of the at least one user is based on the detecting of the at least one physiological parameter.

16. The system of claim 10, wherein the processing device is further configured for:

analyzing the at least one request; and determining a type of the at least one content based on the analyzing of the at least one request, wherein the identifying of the at least one behavioral skill from the plurality of behavioral skills is further based on the determining of the type of the at least one content.

17. The system of claim 10, wherein the processing device is further configured for:

analyzing the at least one request; and determining at least one requirement of the at least one user based on the analyzing of the at least one request, wherein the identifying of the at least one behavioral skill from the plurality of behavioral skills is further based on the determining of the at least one request.

18. The system of claim 10, wherein the plurality of machine learning models comprises a first machine learning model, a second machine learning model, a third machine learning model, and a fourth machine learning model, wherein the first machine learning model is associated with a Google cloud video intelligence, wherein the second machine learning model is associated with a praat parselmouth, wherein the third machine learning model is associated with Amazon Web Service (AWS) speech-to-text, wherein the fourth machine learning model is associated with Amazon Web Service (AWS) comprehend, wherein the first machine learning model is configured for determining the smile gesture and the eye contact gesture from the at least one content, wherein the second machine learning model is configured for determining the speech pitch, the speech volume, and the speech pace from the at least one content, wherein the third machine learning model is configured for determining the speech pace from the at least one content, wherein the third machine learning model and the fourth machine learning model are configured for determining the sentiment from the at least one content, wherein the determining of the plurality of communication attributes is further based on the determining of the smile gesture and the eye contact gesture, the determining of the speech pitch, the speech volume, and the speech pace, the determining of the speech pace, and the determining of the sentiment.

* * * * *